United States Patent [19]

Schroedl et al.

[11] Patent Number: 5,339,012

[45] Date of Patent: Aug. 16, 1994

[54] METHOD AND CIRCUIT ARRANGEMENT FOR SENSOR-LESS DETECTION OF THE ROTATIONAL ANGLE OF A DAMPER-LESS SYNCHRONOUS MACHINE, PREFERABLY EXCITED BY A PERMANENT MAGNET, AND SUPPLIED BY A RECTIFIER

[75] Inventors: Manfred Schroedl, Sieggraben; Thomas Stefan, Bisamberg, both of Austria

[73] Assignee: Elin Energieanwendung GmbH, Vienna, Austria

[21] Appl. No.: 966,061

[22] PCT Filed: Jul. 2, 1991

[86] PCT No.: PCT/AT91/00081

§ 371 Date: Feb. 11, 1993

§ 102(e) Date: Feb. 11, 1993

[87] PCT Pub. No.: WO92/01331

PCT Pub. Date: Jan. 23, 1992

[30] Foreign Application Priority Data

Jul. 13, 1990 [AT] Austria .................................. 1493/90
Apr. 19, 1991 [AT] Austria .................................. 822/91

[51] Int. Cl.⁵ .............................................. H02P 6/02
[52] U.S. Cl. ..................................... 318/254; 318/138
[58] Field of Search ................. 318/254, 700, 138, 439

[56] References Cited

U.S. PATENT DOCUMENTS 4,617,499 10/1986 Yuasa .
4,772,839 9/1988 Macminn et al. .
4,814,677 3/1989 Plunkett ............................. 318/254
4,992,710 2/1991 Cassat ................................ 318/254
5,254,914 10/1993 Dunfield et al. .................... 318/254

FOREIGN PATENT DOCUMENTS 0183277 6/1986 European Pat. Off. .
57-85590 5/1982 Japan .
62-217892 9/1987 Japan .

OTHER PUBLICATIONS

IEEE Transactions on Industrial Electronics and Control, vol. IE-34, No. 2, May 1987, New York (U.S.) pp. 234-239; J. T. Bass et al., "Simplified Electronics for Torque Control of Sensorless Switched-Reluctance Motor".

"Algorithm for Calculated Detection of the Magnet Wheel Position of a Permanent Magnet-Excited Synchronous Machine without a Position Transmitter"; M. Schroedl et al.; in the procedings of the ETG/VDE Conference of Propulsion Systems for Apparatus and Motor Vehicle Technology; pp. 48-54; 1988.

"Detection of the Rotor Position of a Permanent Magnet Synchronous Machine at a Standstill"; M. Schroedl; International Conference on Electrical Machinery; 1986 Pisa, Italy.

"A Permanently Excited, Frequency Converter-Supplied Synchronous Machine without a Magnetic Wheel Transmitter as an RMP-Controlled Drive"; 1986 Karlsruhe University, Germany.

Primary Examiner—Bentsu Ro
Attorney, Agent, or Firm—Sandler, Greenblum & Bernstein

[57] ABSTRACT

A method and circuit arrangement for the sensor-less detection of the angle of rotation of a synchronous machine without a damper is disclosed. According to the disclosed method and circuit arrangement, measuring signals are used which correspond to voltage jumps or pulses generated by a rectifier and the measuring data obtained are provided to a calculating device which calculates the position of the rotor from the dependence of the stator reactance, whereby premagnetization is set when the synchronous machine is started and a measurement is made on each field weakening and strengthening effect. The advantage of the invention resides in both its high precision and the fact that no additional analog current sources are needed to locate the magnet wheel. In addition, the magnet wheel can be located at any load.

9 Claims, 4 Drawing Sheets

METHOD AND CIRCUIT ARRANGEMENT FOR SENSOR-LESS DETECTION OF THE ROTATIONAL ANGLE OF A DAMPER-LESS SYNCHRONOUS MACHINE, PREFERABLY EXCITED BY A PERMANENT MAGNET, AND SUPPLIED BY A RECTIFIER

BACKGROUND OF THE INVENTION

1. Field of the Invention

The present invention relates to a method and circuit arrangement for the sensor-less detection of the rotational angle of a damper-less synchronous machine, that is preferably excited by a permanent magnet and supplied by a rectifier.

2. Description of the Related Art

Because of progress in the areas of magnetic materials, power electronics and information electronics, synchronous machines excited by a permanent magnet are increasingly achieving importance in areas such as propulsion technology. They are distinguished over asynchronous machines in that they utilize simpler technical control structure and have increased efficiency due to very small rotor losses.

There is the necessity for a mechanical transmitter for detecting the magnet wheel position for executing control algorithms in a dynamically high-quality, field-oriented or magnet wheel-oriented control method. It is therefore the goal of many research activities to replace the mechanical transmitter by mathematical models or by utilizing physical effects.

Various methods for determining the position of a magnet wheel of a permanent magnet-excited synchronous machine are known.

Such a method is described in "Algorithmen zur rechnerischen Erfassung der Polradlage einer permanentmagneterregten Synchronmaschine ohne Lagegeber" ["Algorithms for Calculated Detection of the Magnet Wheel Position of a Permanent Magnet-Excited Synchronous Machine without a Position Transmitter"] by M. Schroedl and T. Stefan, in the Proceedings (pp. 48 to 54) of the ETG/VDE Conference "Antriebssysteme für die Geräte- und Kraftfahrzeugtechnik" ["Propulsion Systems for Apparatus and Motor Vehicle Technology"], held in 1988 in Bad Nauheim, FRG. There, the detection of the magnet wheel position of a full pole machine is performed by evaluating the induced voltage. Starting at a certain mechanical revolutions per minute (rpm), a permanent magnet-excited rotor can be used as a transmitter, because a voltage area indicator induced in a stator coil is generally connected with the wanted rotor position in an unambiguous way. In this case, it is permissible to allow non-sinusoidal induction distribution in the air gap. This induced voltage area indicator can be calculated from the terminal voltages, taking into consideration the ohmic and inductive voltage drops.

In this respect, it is disadvantageous that this evaluation can only take place starting from defined minimum rpm, because the amount of the induced voltage area indicator decreases proportionally with the rpm.

The chapter "Detection of the Rotor Position of a Permanent Magnet Synchronous Machine at Standstill" by M. Schr/e,uml/o/ dl, contained in the Proceedings, published in connection with the International Conference on Electrical Machines in Pisa, Italy, in 1986, reports another method.

In this method, the varied magnetic saturation caused by the permanent magnets is measured by means of electrical measurement signals. Because this type of measurement is reproducible, the rotor position can be exactly determined. The knowledge of the polarity of the magnets required for executing this measurement can be obtained by changing the magnetic operating point and measuring its effect on the impedance. In this case, the rotor position can also be determined with the machine stopped.

The disadvantage of this method lies in that the measuring process becomes very expensive because of the requirement for an additional analog current source.

The dissertation of H. Vogelmann, "Die permanenterregte umrichtergespeiste Synchronmaschine ohne Polradgeber als drehzahlgeregelter Antrieb" ["A Permanently Excited, Frequency Converter-Supplied Synchronous Machine without a Magnetic Wheel Transmitter as an Rpm-Controlled Drive"] (Karlsruhe University, FRG, 1986) also deals with a method for detecting the magnet wheel position.

In this case, a relatively high-frequency current, generated by means of the frequency converter, is superimposed as a test current on the actual useful signal. The basic idea here is that an electrical alternating signal connected in a defined (area indicator) direction in general also causes a reaction in the orthogonal direction because of the various inductivities in the longitudinal and crosswise axes. Such coupling does not occur only in the case where the alternating signal is applied exactly in the longitudinal or crosswise direction of the rotor. This results in a criterion, showing whether the signal is applied in the wanted defined direction or not. A prerequisite for obtaining exact measurement results is a permanent magnet-excited synchronous machine, having a salient pole characteristic, i.e., with dissimilar inductivities in the longitudinal and crosswise directions, such as with flux-concentrating devices.

The majority of permanent magnet-excited synchronous machines, however, are not produced as flux-concentrating types, but with a constant air gap and magnets glued on the rotor surface. This is a simpler construction technique and permits air gaps of approximately 1 Tesla, when high-quality samarium-cobalt or neodymium-iron magnets are used.

Thus, there is the disadvantage in the above-mentioned detection methods in that useful results are only obtained with machines having definite salient pole characteristics.

SUMMARY OF INVENTION

It is therefore an object of the present invention to realize a method for a sensor-less position detection of the rotor of a permanent magnet-excited synchronous machine, by measuring electrical values exclusively, and to further avoid the disadvantages or inaccuracies of the known methods described above.

This object is attained by means of the present invention. The present invention is distinguished in that the measuring signals are voltage jumps or pulses generated by the rectifier, which are supplied to a calculator which calculates the magnet wheel position from the angular dependency of the quotient of the stator voltage area indicator and the temporal change of the current area indicator (hereinafter referred to as the complex differential inductivity), wherein the complex differential inductivity fluctuates approximately sinusoidally in its amount, as well as in its argument, by double the value of the wanted angle of rotation. This step, according to the present invention, is repeated with a changed voltage area indicator direction in preferably the same amount of phase and the local complex differential inductivity for each direction of measurement. Accordingly, double the value of the wanted angle of rotation, which corresponds with the magnetic axis, is determined with the use of known methods, with the idealized assumption of the sinusoidal fluctuation of the amount and phase of the complex differential inductivity, where its amount has its extreme values in the axis of magnetization and electrically 90 degrees thereon, and its argument passes zero at these points and has its extremes at angles of electrically 45°+k.90°, and impresses into the magnetic axis. Determined in this way, the present invention determines a current area indicator only one time at the start of the machine, for the purpose of changing the magnetization, and determines immediately, as described above, the complex differential inductivity and calculates its value, and then impresses a current area indicator in the opposite direction of the previously impressed current area indicator and again calculates the value. Thereafter, the magnetization direction which corresponds to the wanted angle of rotation is determined based on the fact that the magnetization direction corresponds to the minimum of the two previously calculated values.

One advantage of the present invention lies in its great accuracy, as well as the fact that no additional analog current sources are required for the magnetic wheel detection, and that the current providing rectifier, which is there anyway, is used as a measuring signal generator.

The present invention is also advantageous in that the exact magnetic wheel detection can be performed at arbitrary loads.

According to a further aspect of the present invention, two measurements are performed in sequence, wherein the voltage area indicator of the second measurement is either opposite the voltage area indicator of the first measurement or it is a zero voltage area indicator. The difference of the voltage area indicators used in these measurements on the one hand, and the difference of the temporal changes of the current area indicators determined from these measurements on the other hand, are formed and these area indicator values take the place of the corresponding area indicator values of the individual measurements.

The effect of the rotationally generated voltage stemming from the magnet is compensated in this way. Because of this, the method works at all rpm, and the same high accuracy is also obtained in the lowest rpm range and when the machine is stopped.

A further characteristic of the present invention consists in that with the synchronous machine operating, the electromotive force is calculated from the instantaneous estimated values of the angle of rotation and the rpm, and that their effect on the measured results is compensated.

According to the present invention, it is possible to attain a high degree of accuracy with only one measurement and in combination with correction values in a table.

Further advantageous embodiments and circuit arrangements of the present invention, as described in greater detail below, may be utilized. In this way, the magnetic wheel detection method and apparatus of the invention can be implemented without problems common to conventional control concepts (e.g., tolerance band guidance, preset pulse pattern, etc.).

In accordance with a further aspect of the invention, the voltage, current, rpm and amount of flux dependent deviations from the theoretically expected values, occurring during the formation of the complex parameters, are taken into account or eliminated by correction values. The correction values are stored in tables or are determined by simple correction functions. Further, when a defined minimum angular speed is exceeded, the correction values may be determined by forming mean values from the real and imaginary parts through delay members.

This further aspect of the present invention advantageously results in the accuracy of the flux detection being considerably improved.

According to a further aspect of the present invention, rotor speed is calculated by means of two corresponding partial measurements performed with a complementary frequency converter circuit, such that the rotor speed is determined while eliminating the frequency converter voltage, so that the current change sum area indicator fixes the product of the stator flux linking area indicator and rotating field speed. Thus, the rotor speed is determined from the value and the rotor position from the angle of this complex indicator.

The above-noted embodiment has been proven to be valuable, since by means of it, it is possible to realize a measuring method based on electromotive force without voltage sensors.

A still further aspect of the present invention is distinguished in that the flux information obtained is combined with a voltage model for synchronous machines, which calculates the flux from the stator equation, and that measurements in accordance with the invention are inserted on a case basis into rpm ranges where the voltage model becomes unusable because of interfering drift and parameter uncertainties, which then intervene in a correcting manner in the estimated rotor position values determined from the voltage model.

It has proven to be advantageous to increase the time between two measurement cycles, because the sound reflections and the electrical losses are reduced by this.

The above-listed and other objects, features and advantages of the present invention will be more fully set forth hereinafter.

BRIEF DESCRIPTION OF THE DRAWINGS

The invention is described in detail in the description which follows, by means of exemplary embodiments using a three-phase synchronous machine; however, the invention can be used in the same way for synchronous machines with different numbers of phases.

The invention is described by reference to the noted plurality of drawings by way of non-limiting examples of preferred embodiments of the invention, in which like reference numerals represent similar parts throughout the drawings, and wherein.

Figure 1:
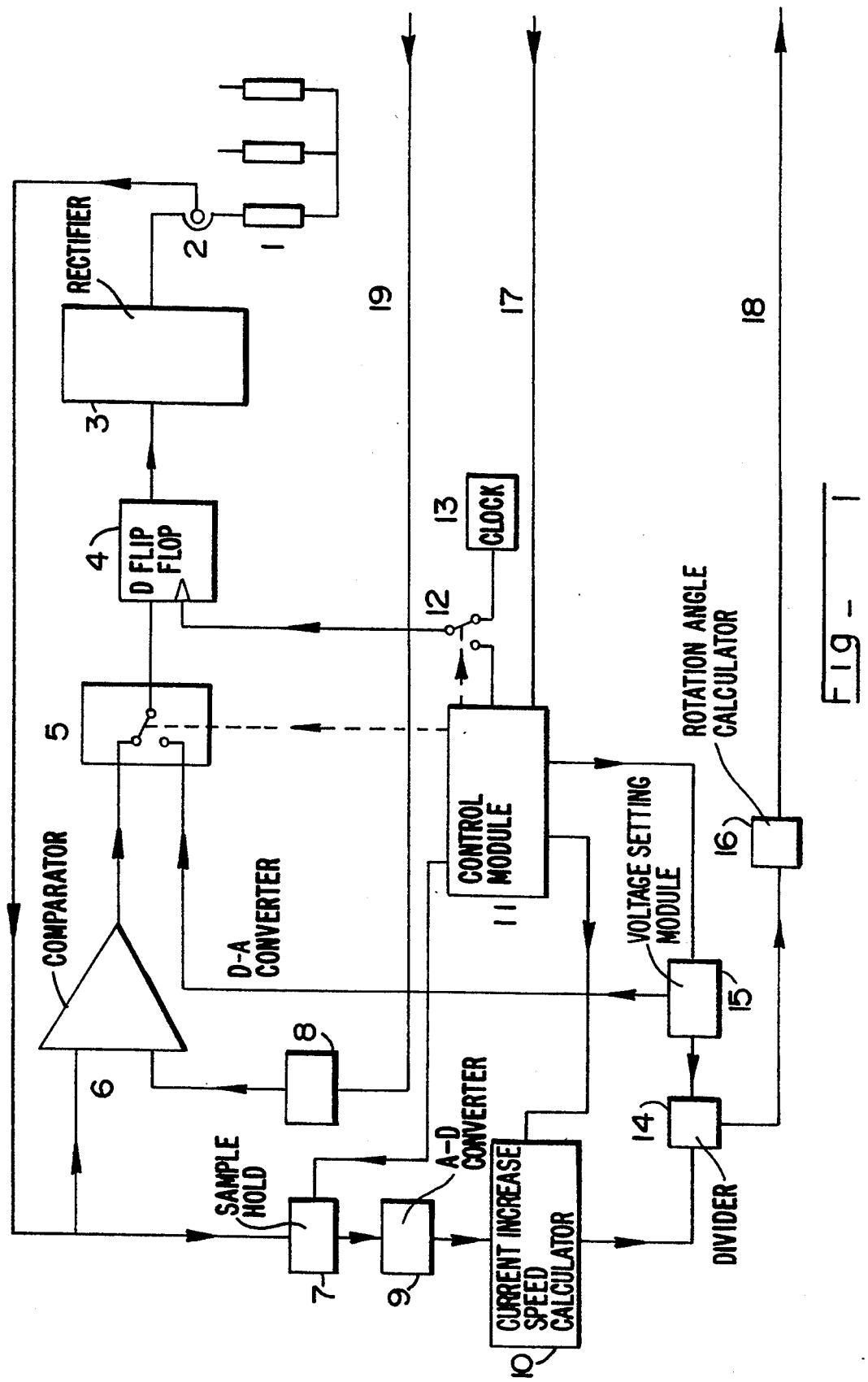
FIG. 1 shows a measurement method according to the present invention with fixed measuring times.

In all of the drawings, the circuit for one phase of the stator winding is only shown; for the other two phases, it is, of course, analogous.

DETAILED DESCRIPTION OF THE PREFERRED EMBODIMENTS

The method and apparatus of the present invention are based on the fact that defined iron portions in the machine are saturated at air gap induction values of approximately 1 Tesla. With permanent magnet excitation, the stator teeth are considerably saturated. Furthermore, a certain amount of saturation in the yoke is conceivable with an appropriate design.

A (small) stator current signal generates an additional magnetic field in the stator which extends, depending on the current indicator direction, on paths with different magnetic conductance. With a current area indicator parallel to the area indicator of the magnetic flux generated by the permanent magnet, the additional magnetic field extends in the areas which are magnetically highly stressed, and with the current area indicator applied normally thereto, the saturated regions are not extensively touched.

Thus, for each area indicator direction of a measurement stator current, the magnetic distribution in the machine defines an operating point on the magnetic characterizing curve which indicates the connection between the area indicator values of flow-through and magnetic flux. Depending on the observed area indicator direction, this operating point fluctuates between a minimum value in the linear part and a maximum value in the bend of the characterizing curve. These modulations of the operating point can be detected by measuring the differential inductivity of the observed area indicator direction. In this case, the current change is negligibly small in comparison with the rated current, so that the magnetic conditions remain almost unaffected. The influence of the stator resistance in this case is so small that it can be disregarded.

To avoid the disadvantages (e.g., measurement only possible when the rotor is stopped and unstressed; large expense for measurements and calculations; use of a measuring signal generator as an add-on device, instead of the frequency converter; etc.), resulting during measuring with an analogous measurement voltage source and sinusoidal measuring signals, the frequency converter itself is used as the measuring signal generator in the present invention.

Stopped Machine

Voltages switched from the frequency converter bridges are connected to the synchronous machine as measuring signals. Thereafter, the differential inductivity is determined on the basis of the rise of the current area indicator value. With the possible voltage area indicator directions (e.g., 0, 120, 240 degrees in a three-phase system) it is possible to obtain a measurement of the statement value equivalent to that of an analogous add-on signal source. Further, by means of repeated measurements during operation, it is possible to perform a statistical evaluation of the incoming information and thus enable great measurement accuracy.

Rotating Machine

The effect of the rotationally induced voltage is eliminated to the greatest extent by the combination of two measurements. Two measurements are performed and a switching operation is performed after the first measurement in a bridge (for example, bridge A or, alternatively, in all other bridges but bridge A; both cause a measurement in the same area indicator direction). Then the value of second measurement is subtracted from the value of first measurement. The voltage difference area indicator indicates the direction of the phase connected with the switched inverted rectifier bridge so that it suffices to measure the current change during the intervals I and II only in the respective phase. (Because of the different inductivities based on pre-saturation, the voltage and measuring current area indicators slightly diverse from each other. With conventional saturation conditions, this variation is maximally 7 degrees. However, this variation is a reproducible effect and thus a correctable error.) The effects of rotationally induced voltage can be compensated by this measuring strategy.

At higher rpm, rotation during the measuring time should not be neglected. In this case the measuring step of interval II can be split into two partial measurements, of which the first part is executed prior to and the second part following interval I (the same voltage area indicator is applied in both partial measurements). Because of this, practically the same (i.e., mean) value of the induced voltage appears.

The induced voltage can also not be neglected with higher rpm. Because of this voltage, current change no longer takes place parallel to the applied stator voltage area indicator, but in the direction of the difference between the area indicators of the stator voltage and the induced voltage. Thus, in the intervals I and II, the measurement appears to take place in more or less diverging area indicator directions. It can be clearly proven mathematically (by using the area indicator calculation) that the measurement, by means of forming the difference between the two intervals, actually provides the inductivity value of the wanted direction.

To start the system, it is absolutely necessary to determine the polarity of the permanent magnet, because otherwise the defined rotor position contains an uncertainty of 180 degrees (electrical). The reason for this is that the inductivity fluctuations are repeated twice per electrical revolution.

In the present case, the polarity determination takes place by the sole use of the frequency converter. Following the determination of the direction of the minimum and maximum inductivity, which is directly related to the magnetic wheel position or the direction of magnetization of the rotor, a relatively large stator current area indicator is applied in approximately this direction, and a defined displacement of the operating point occurs. Thereafter, a new inductivity measurement, as previously described, is performed at this new magnetic operating point. Whether or not this additional signal has resulted in an increase or decrease of the saturation can be determined when the exactly opposite additional flow-through is applied and the differential inductivity is again determined.

If a constant voltage area indicator is applied to the machine, the value of the flux linked with the stator changes over time, while the current increases progressively when the range of magnetic saturation has been reached. The measurement of the inductivity takes place, for example, by means of a constant current changing interval. The times between the switching operations are then a measure of the differential inductivity.

As a result of the low stator inductivity, even currents in the range of the rated value do not result in a serious change of the saturation conditions in the machine. Although the "inductivity ellipses" are somewhat flattened, the course of the angle-dependent inductivity is maintained and the effect is measurable. There is the possibility to store the load-dependent saturation conditions in a fixed value memory and to interrogate it for the respective parameters depending on the load current. The load points can be reduced accordingly, so that only stator components (i.e., torque generating components) appear which are normal for the flux.

Various possibilities for the measurement operation are conceivable for the practical determination of the rotor position. The two most preferable include preselecting a fixed measuring interval or a fixed current change value.

When pre-setting a fixed measuring interval, the time of the internal I is fixed to be equal to that of the interval II and to be constant. Assuming that the inductivity in the direction of phase A is to be measured, the status of the inverted rectifier bridges A, B, C in the interval I is 1, 0, 0, for example (wherein 1 means the inverted rectifier bridge on a positive intermediate circuit potential), and in the interval II is 0, 0, 0 or 0, 1, 1, for example. In each case, the differential voltage area indicator points in the direction of the phase axis A. If the real axis of the area indicator coordinate system is placed in the phase axis to be measured, the result is that the inverse value of the wanted inductivity is proportional to the difference between the respective phase current changes in the intervals I and II.

FIG. 1 shows a circuit variant of the method of the invention with fixed measuring times in a current-regulated, preferably permanent magnet-excited synchronous machine where the method has been integrated into a conventional control.

In FIG. 1, a phase of the stator winding 1 of the synchronous machine is picked up at a current measuring device 2 and is supplied to a first input of a comparator 6 without hysteresis and to the first input of a sample-and-hold member 7. The output of the sample-and-hold member 7 is connected via an analog-digital converter 9 with a first input of a current increase speed calculator 10. As further shown in FIG. 1, the output of the comparator 6 system without hysteresis is connected to a first input of a switching logic device 5, and a measuring request signal from a control device (not shown) is supplied via a first line 17 to an input of a module 11 for measuring operation control. A first output of the measuring operation control module 11 is connected with a first switching contact of a change-over switch 12. A second switching contact of the change-over switch 12 is connected with an output of a clock generator 13, and the base contact of the change-over switch 12 is connected with the dynamic input of a D-flip-flop 4. The static input of the D-flip-flop 4 is connected with the output of the switching logic device 5, with digital switching commands being supplied via the output of the D-flip-flop 4 to a bridge arm of the rectifier 3.

In addition, as illustrated in FIG. 1, a second output of the measuring operation control module 11 is connected with a second input of the sample-and-hold member 7, and a third output of the control module 11 is connected with a second input of the current increase speed calculator 10. The output of the current increase speed calculator 10 is connected with the first input of a divider 14, and the output of the divider 14 is connected with the input of an angle of rotation calculator 16. The angle of rotation calculated by the angle of rotation calculator 16 can be supplied via a second line 18 to the control device (not shown).

A fourth output of the measuring operation control module 11 is connected with the input of a module 15 for pre-setting the voltage area indicator. A first output of the module 15 for pre-setting the voltage area indicator is connected with a second input of the divider 14, with the output of the module 15 being connected with a second input of the switching logic device 5. The set value from the control device is supplied via a third line 19 to the input of a digital-analog converter 8, and the output of the digital-analog converter 8 is connected with a second input of the comparator 6.

In the course of normal control, comparator 6 without hysteresis compares the set values of the phase currents. The D-flip-flop 4 permits a switching state change of the bridge arms of the rectifier 3 to the positive (or alternatively negative) edges of the clock signal.

During the measuring operation, the module 11 takes over control of the system for controlling the measuring operation. The comparator 6 is taken out of operation by means of a switching logic device 5, and a voltage area indicator in accordance with the measuring protocol is directly connected with the synchronous machine by means of the bridge arms of the rectifier 3. The current changes are detected by means of sample-hold member 7 and analog-digital converter 9, and the area indicator value is determined therefrom. The complex inductivity $L_{diff}$ is calculated in the divider 14 by dividing this value by the voltage area indicator applied, and the angle of rotation is formed by the angle of rotation calculator 16, by means of known methods, and is supplied to the control device (not shown). After all required voltage area indicators have been applied and all associated current values have been detected, the measuring operation control module 11 transfers control back to the control device (not shown) by changing the switching logic device 5 back.

Figure 2:
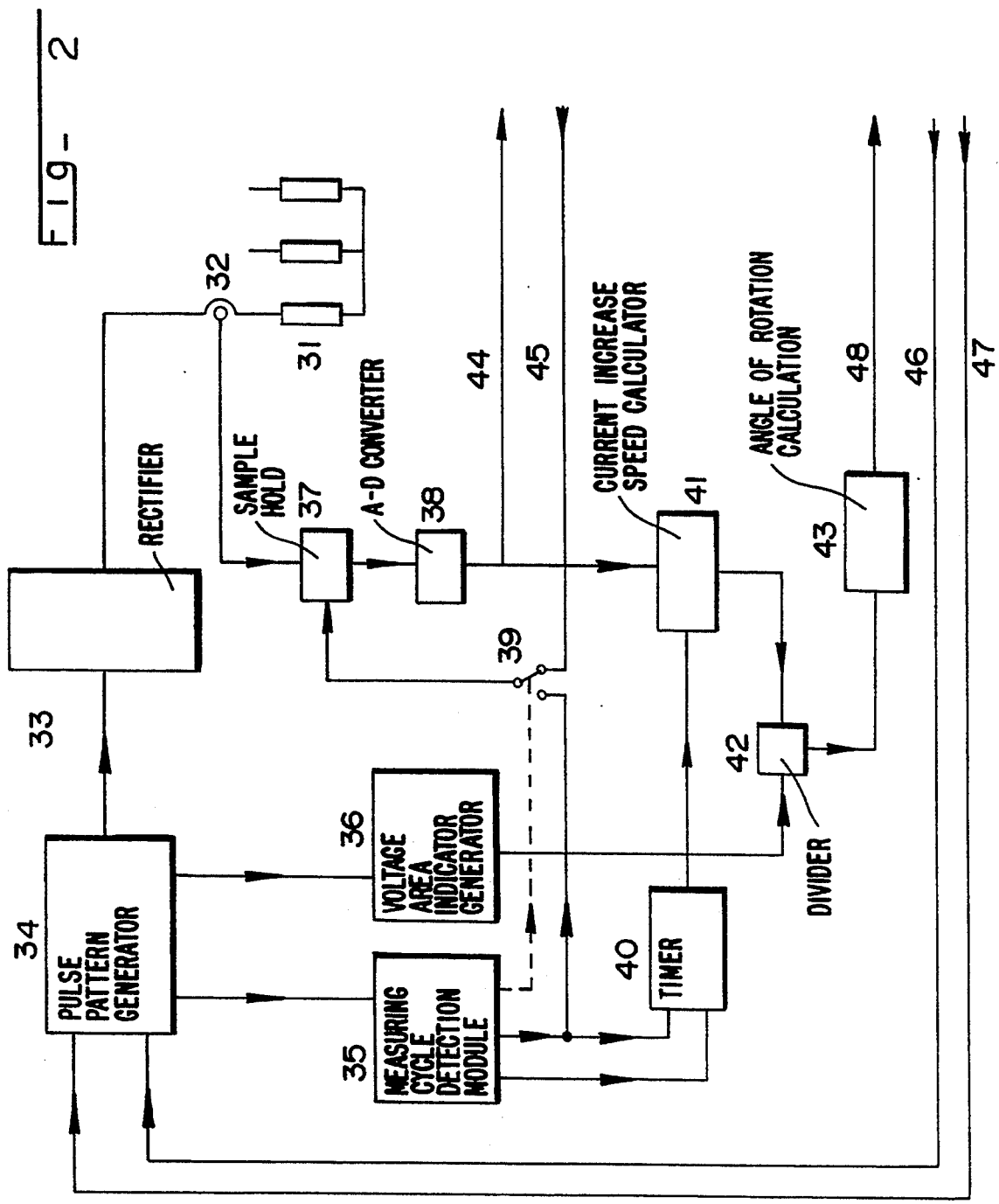
FIG. 2 illustrates the integration of a method of the present invention into a voltage control with a fixed pulse pattern.

The application of the present invention into a voltage control with a fixed pulse pattern is shown in FIG. 2.

In FIG. 2, an actual current value of respectively one phase of the stator winding 31 of the synchronous machine is picked up at a current measuring device 32 and supplied to a first input of a sample-and-hold member 37. The actual current value is supplied from the output of the sample-and-hold member 37 via an analog-digital converter 38 to a first input of a current increase speed calculator 41 and over a first line 44 to a control device (not shown). A scanning command is supplied from the control device via a second line 45, as well as via first switch-over contact and a base connection of a change-over switch 39, to a second input of the sample-and-hold member 37. In addition, the pre-set voltage or the pre-set frequency may be supplied from the control device via a third line 46 or via a fourth line 47 to a first or a second input of a pulse pattern generator 34 with integrated measuring cycles.

As shown in FIG. 2, digital switching commands can be supplied via a first input of the pulse pattern generator 34 to a bridge arm of the rectifier 33, with a second output of the pulse pattern generator 34 being connected with the input of a module 35 for measuring cycle detection and control. A third output of the pulse pattern generator 34 is connected with the input of a voltage area indicator generator 36, and a first output of the module 35 for measuring cycle detection and control is connected with a first input of a timer 40. Further, scanning commands for the measuring operation control can be supplied from a second output of the measuring cycle detection and control module 35 to a second input of the timer 40, as well as to a first switchover contact of the changeover switch 39. The output of the timer 40 is connected with a second input of the current increase speed calculator 41, and the output of the voltage area indicator generator 36 is connected with a first input of a divider 42.

As further illustrated in FIG. 2, the output of the current increase speed calculator 41 may be connected with a second input of the divider 42, and the output of the divider 42 may be connected with the input of the angle of rotation calculator 43. Further, the formed angle of rotation can be supplied from the output of the angle of rotation calculator 43, via a fifth line 48, to the system control device (not shown).

During normal control operation, a controller calculates the required voltage amplitude and frequency, which are formed by the pulse pattern generator 34. The pulse pattern generator 35 integrates the measuring cycles, and the measuring cycle recognition and control module 35 is informed of the appearance of a measuring cycle. Thereafter, module 35 triggers a measurement of the current change and of the associated time interval. It is simultaneously informed of the voltage area indicator by the pulse pattern generator 34. With this, the differential inductivity and, from it, the angle of rotation is calculated again, as described above with respect to FIG. 1. Following the measuring cycle, scanning of the actual current values is again controlled by the control device (not shown).

Figure 3:
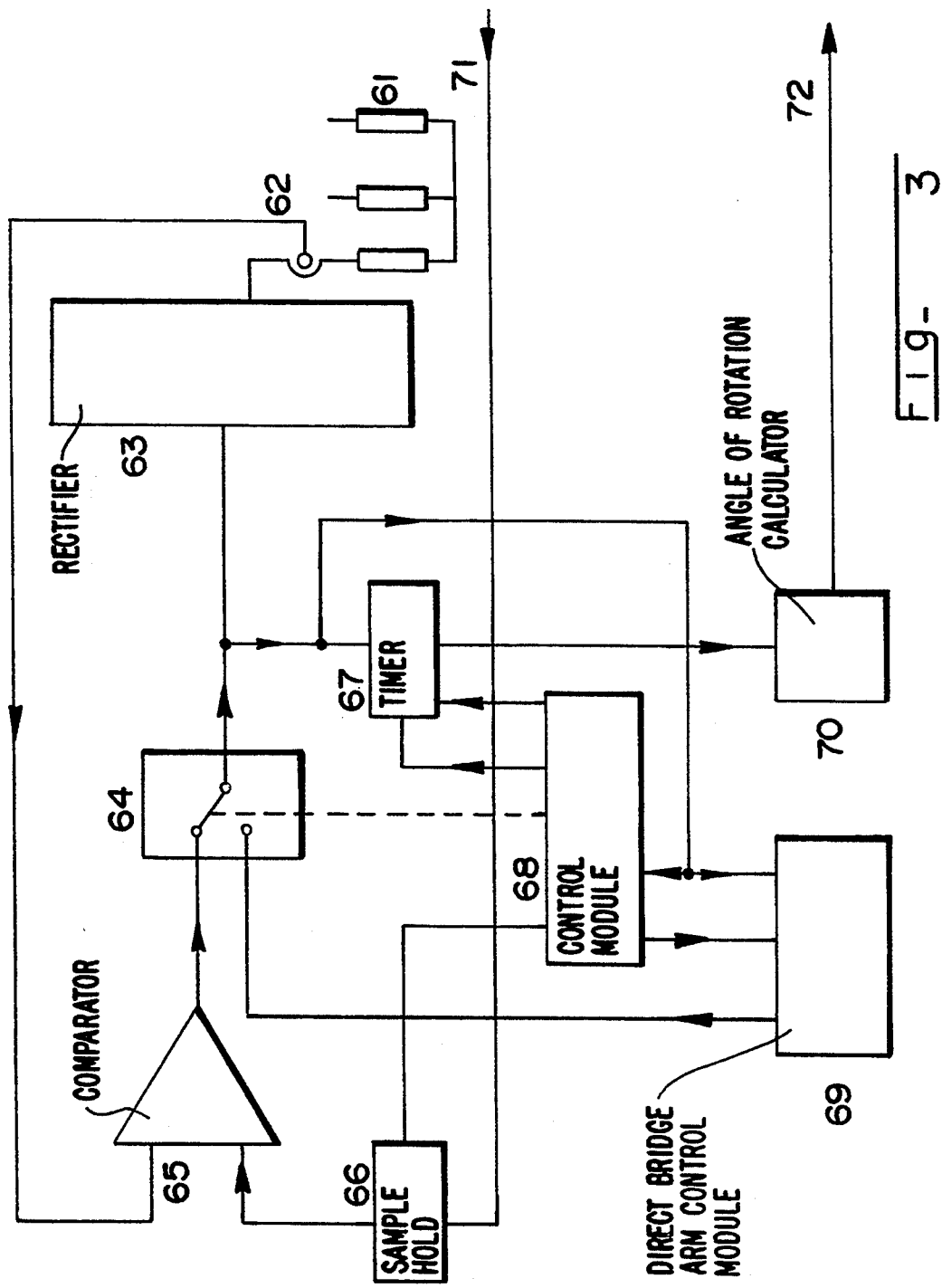
FIG. 3 illustrates an application of the present invention with defined current changes in a drive with a tolerance band current regulator.

The application of the present invention with tolerance-band current regulators is shown in FIG. 3.

In FIG. 3, an actual current value of respectively one phase of the stator winding 61 of the synchronous machine is picked up at a current measuring device 62 and supplied to a first input of a comparator 65 affected by hysteresis. The output of the comparator 65 affected by hysteresis is connected with a first input of a switching logic device 64.

Digital switching commands can be supplied via the output of the switching logic device 64 to a bridge arm of the rectifier 63. Further, the output of the switching logic device 64 may be connected with the input of a measuring operation control module 68, as well as with, respectively, one input of a timer 67 and of a module 69 for direct bridge arm control during measurement. In addition, a first and second output of the measuring operation control module 68 may be connected with a second and third input of the timer 67. A third output of the measuring operation control module 68 is connected with a first input of a sample-and-hold member 66, and a third output of the measuring operation control module 68 is connected with a second input of the module 69 intended for the direct bridge arm control during measurement.

The output of the module 69, intended for the direct bridge arm control, may be connected with a second input of the switching logic device 64, and a set current value may be supplied by a system control device (not shown), via a first line 71, to a second input of the sample-and-hold member 66. Further, the output of the sample-and-hold member 66 is connected with a second input of the comparator 65 affected by hysteresis, and the output of the timer 67 is connected with the input of a rotation angle calculator. As shown in FIG. 3, the formed angle of rotation can be supplied to the control device from the output of the angle of rotation calculator 70 via a second line 72.

In normal control operation, the phase current set values are supplied to the comparator 65 affected by hysteresis. By means of a comparison with the actual current values, the bridge arms of the rectifiers 63 are appropriately switched when leaving the hysteresis.

The measurement operation control takes over control of the system during the measuring operation. The current set value of one phase of the stator winding 61 is detected by the sample-hold member 66. In the other phases of the stator winding 61, the switched state of the bridge arms of the rectifier 63 is frozen by means of switching logic device 64 by the direct bridge arm control. The amount of time the current requires to cross the tolerance band in the one phase of the stator winding 61 to be measured, is determined by means of the timer 67, with the current changing speed being fixed by this. This measuring operation is repeated with the different phases of the stator winding 61. Again, the angle of rotation can be calculated as explained above with respect to FIG. 1. Thereafter, the measurement operation control returns control of the phase currents to the system control device.

Figure 4:
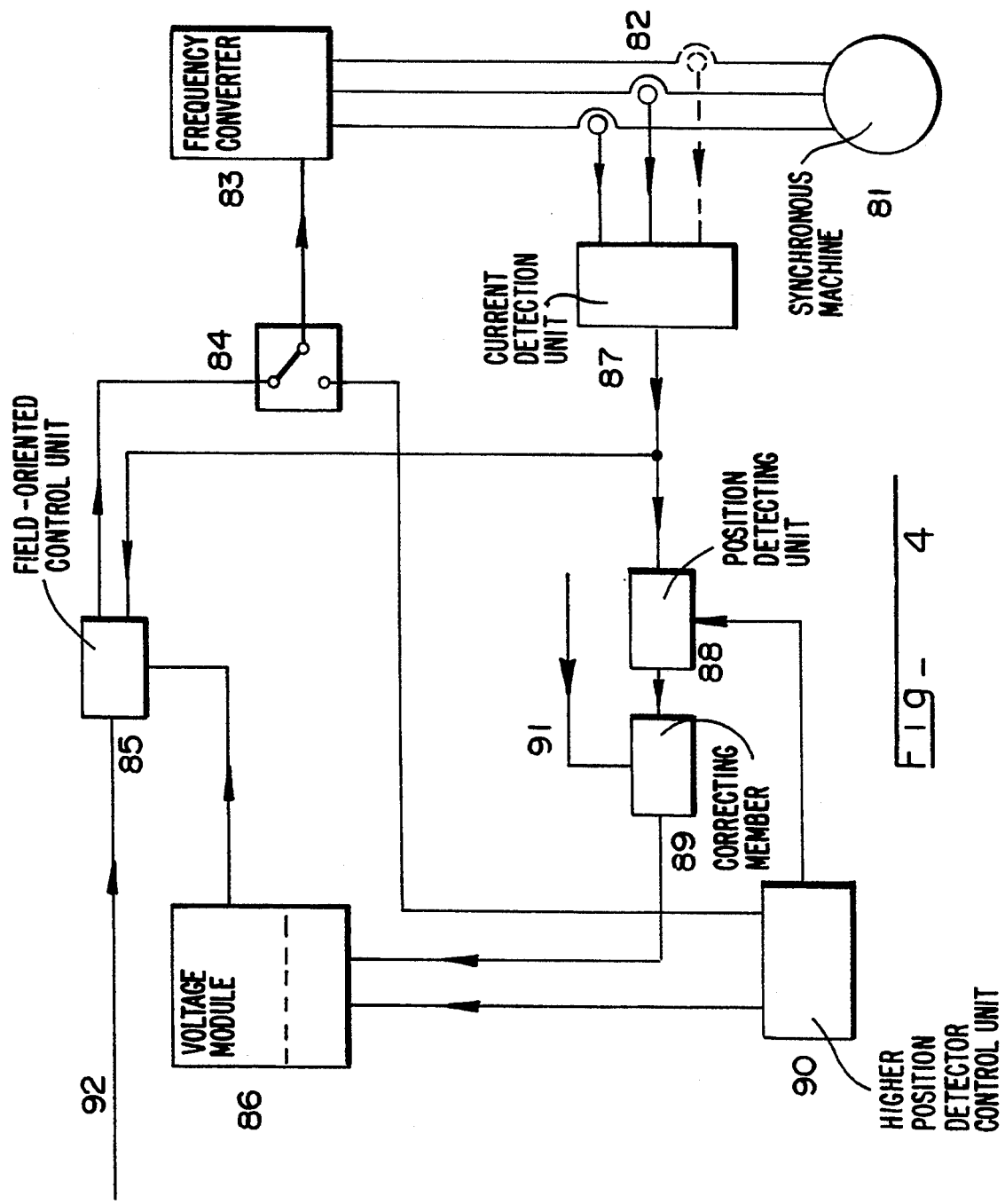
FIG. 4 illustrates a further embodiment of the present invention that utilizes a voltage model.

A further aspect of the present invention is illustrated in FIG. 4.

As shown in FIG. 4, a synchronous machine 81 is supplied by a voltage intermediate circuit frequency converter 83 via three current measuring modules 82. The actual currents from the current measuring modules 82 are passed on, via a current detection unit 87, to a position detection unit 88. The timing of which is controlled by a higher position detection control 90. A temporary rotor position is then calculated in accordance with the algorithms of the invention and supplied to a correcting member 89. The rotor position is corrected, using instantaneous estimated values of position, rpm, torque, flux amount and intermediate circuit voltage, which are supplied to the correcting member 89 via line 91. The corrected rotor position information is then supplied to a voltage module 86 for the synchronous machine and is used, from case to case, as an adaptation of the position determined by the voltage module 86. This adaptation setup is also coordinated over time by the higher position detection control 90.

The improved rotor position determined in this way is used in a field-oriented control 85 in order to generate inverted rectifier bridge trigger signals from a set moment, required by a higher control algorithm, which is supplied to the field-oriented control 85 via a line 92. During a position calculation with measuring signals, the inverted rectifier bridge trigger signals are generated by the position detection control 90. The output of the field-oriented control 85 is connected with a first input of a switching logic device 84. In addition, as shown in FIG. 4, a second input of the switching logic device 84 is connected with the position detection control 90. The bridge trigger signals are supplied to the voltage intermediate circuit frequency converter 83 via an output of the switching logic device 84. Because the sum of the currents supplied to the synchronous machine must be zero, one of the three current measuring modules 82 can be omitted, based on the node rule.

We claim:

1. A system for executing sensor-less detection of the rotation angle of a magnetic wheel of a synchronous machine having a permanent magnet and supplied by a rectifier, said system comprising:

means for generating voltage pulses with said rectifier, said voltage pulses being supplied by a stator winding of said synchronous machine;

means for forming measuring signals based on said voltage pulses;

means for calculating the position of said magnetic wheel; and means for supplying said measuring signals to said calculating means;

said calculating means comprising a divider for calculating a quotient value equal to a voltage area indicator divided by a detected temporal change in current in the stator winding of said synchronous machine, said quotient value comprising a complex differential inductance value, having an amplitude and phase that each fluctuate approximately sinusoidally, the fluctuations being based on the angle of rotation of the magnetic wheel position, means for changing at least the voltage area indicator by a given increment in phase, means for measuring the corresponding temporal change in current, and means for determining a new complex differential inductance value based on the change in the voltage area indicator, whereby said calculating means calculates the angular position of the magnetic wheel as a function of the complex differential inductance values.

2. A system according to claim 1, wherein said means for forming measuring signals comprises a current measuring device disposed between the rectifier and the stator of said synchronous machine.

3. A system according to claim 1, wherein said calculating means comprises an angle of rotation calculator, an input of said angle of rotation calculator being connected to an output of said divider.

4. A system according to claim 1, further comprising a current increase speed calculator for determining the temporal change in current, an output of said current increase speed calculator being connected to an input of said divider.

5. A method for executing sensor-less detection of the rotation angle of a magnetic wheel of a synchronous machine having a permanent magnet and supplied by a rectifier, comprising the steps of:

(a) generating voltage pulses with the rectifier and forming measuring signals;

(b) supplying the measuring signals to a calculator;

(c) calculating, with the calculator, the position of said magnetic wheel, said calculating step comprising: determining the position of said magnetic wheel by: (i) calculating a quotient value equal to a voltage area indicator divided by a detected temporal change in current in a stator winding of said machine, said quotient value comprising a complex differential inductance value, having an amplitude and phase that each fluctuate approximately sinusoidally, the fluctuations being based on the angle of rotation of the magnetic wheel position; (ii) changing at least once the voltage area indicator by a given increment in phase, measuring the corresponding temporal change in current, and determining a new complex differential inductance value in accordance with step (i); and, (iii) calculating the angular position of said magnetic wheel as a function of the complex differential inductance values determined in steps (i) and (ii).

6. A method in accordance with claim 5, wherein two measurements of the temporal change in current are performed in sequence, the voltage area indicator of the second measurement being either one of a zero voltage area indicator and a voltage area indicator opposite to that of the first measurement.

7. A method in accordance with claim 5, further comprising the step of calculating the electromotive force while the synchronous machine is operating, the electromotive force being calculated based on the estimated value of the angle of rotation.

8. A method in accordance with claim 5, further comprising the step of correcting deviations, in at least the voltage and current, from theoretically expected values with correction values.

9. A method in accordance with claim 5, further comprising the step of determining the rotor speed based on two corresponding measurements performed by a frequency converter circuit.

* * * * *